United States Patent [19]
Takahashi et al.

[11] Patent Number: 6,116,096
[45] Date of Patent: Sep. 12, 2000

[54] MOUNTING STRUCTURE FOR A VEHICLE LOAD MEASURING SENSING ELEMENT

[75] Inventors: Naoya Takahashi; Masaya Tsuchie, both of Shizuoka, Japan

[73] Assignee: Yazaki Corporation, Tokyo, Japan

[21] Appl. No.: 09/142,991

[22] PCT Filed: Apr. 15, 1996

[86] PCT No.: PCT/JP96/01030

§ 371 Date: Sep. 18, 1998

§ 102(e) Date: Sep. 18, 1998

[87] PCT Pub. No.: WO97/39316

PCT Pub. Date: Oct. 23, 1997

[51] Int. Cl.[7] .......................... G01G 19/00; G01G 21/00
[52] U.S. Cl. .......................... 73/862.621; 73/781
[58] Field of Search ................. 73/118.1, 767, 73/781, 779, 862.632, 862.621, 862.627

[56] References Cited

U.S. PATENT DOCUMENTS

| | | | |
|---|---|---|---|
| 3,975,685 | 8/1976 | Bielsten et al. | 324/220 |
| 4,086,576 | 4/1978 | Jebb et al. | 340/440 |
| 5,055,078 | 10/1991 | Lee et al. | 445/51 |
| 5,681,998 | 10/1997 | Nakazaki et al. | 73/118.1 |
| 5,789,683 | 8/1998 | Takahashi et al. | 73/862.621 |

FOREIGN PATENT DOCUMENTS

| | | |
|---|---|---|
| 4-99041 | 8/1992 | Japan . |
| 6-16826 | 3/1994 | Japan . |
| 6-69760 | 9/1994 | Japan . |
| 7-239266 | 9/1995 | Japan . |

Primary Examiner—Max Noori
Attorney, Agent, or Firm—Armstrong, Westerman, Hattori, McLeland & Naughton

[57] ABSTRACT

A structure for attaching a sensing element for measuring load on a vehicle to a slide plate can reduce the number of components and gives good detection sensitivity. Mounting holes are made at an angle of about 20° at both ends of an internal curved surface of the slide plate. Sensing elements each is secured in each the mounting holes. A wiring plate is placed centrally on a concave portion of the internal curved surface of said slide plate and is used to integrate lead wires from the sensing elements and extend them externally. The wiring plate and lead wires are molded.

7 Claims, 8 Drawing Sheets

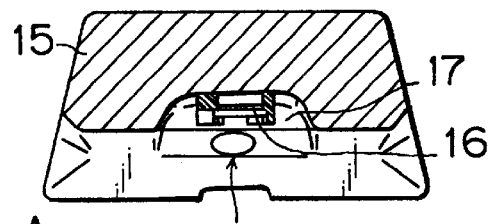
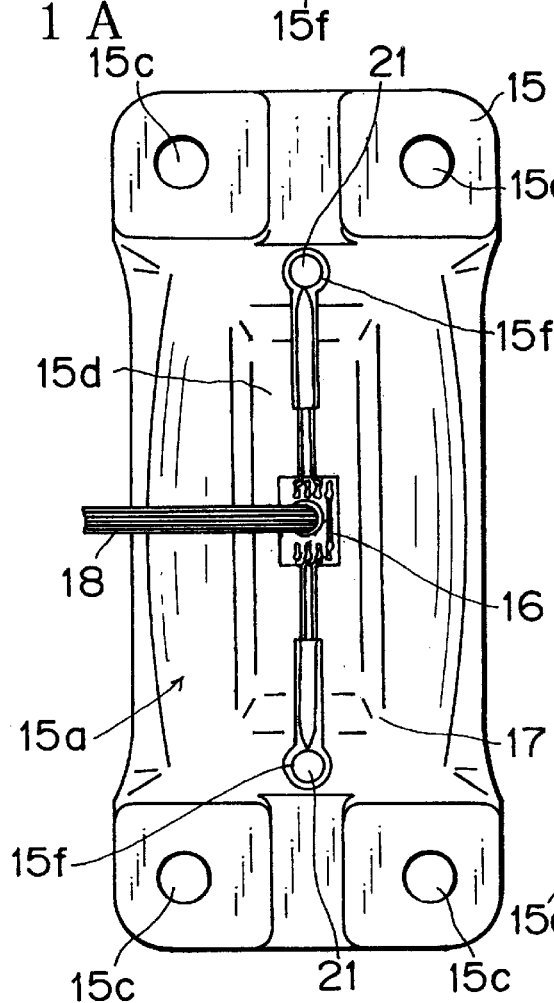
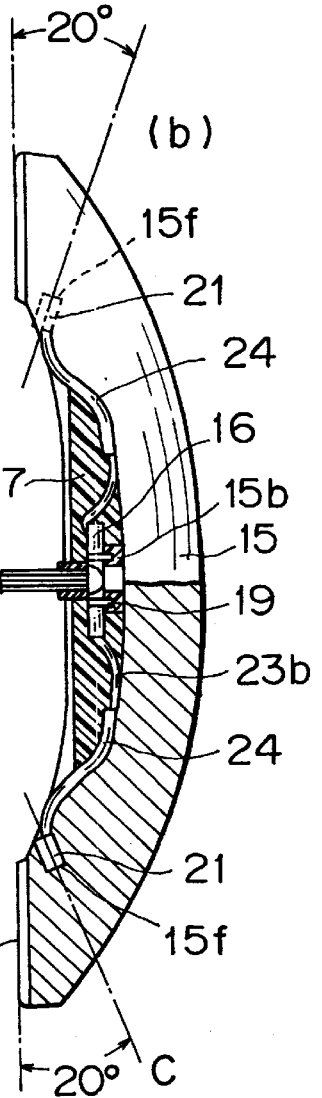

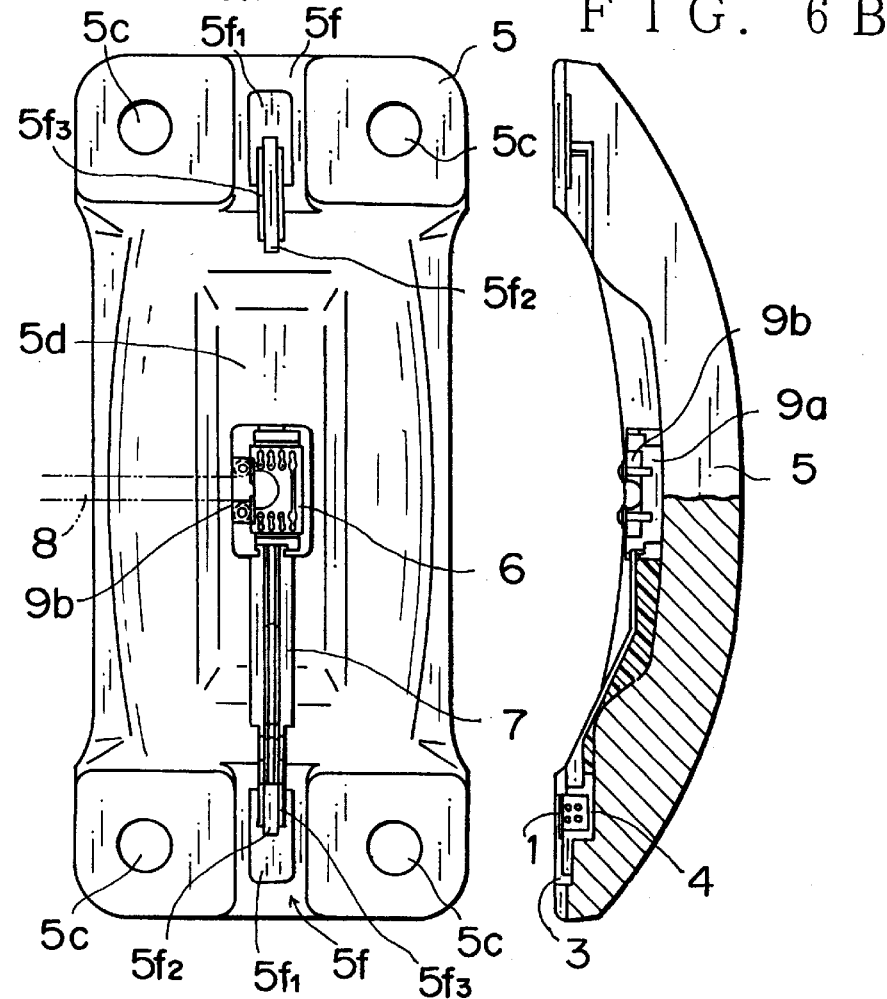

MOUNTING STRUCTURE FOR A VEHICLE LOAD MEASURING SENSING ELEMENT

TECHNICAL FIELD

The present invention relates to a structure for attaching an sensing element for measuring load on a motor vehicle.

BACKGROUND ART

Generally, the load on a large-scale motor vehicle is measured using a load measuring device installed on a road. This device, however, is large in size and is high in installing cost so that the installing place and number of devices are limited. Only a partial number of all vehicles can be subjected to measurement. Thus, such a device was insufficient to detect excessive loading.

For the reason described above, in recent years, a load measuring device has been mounted on a vehicle itself. For example, a "self-weight meter" has been proposed. In the self-weight meter, with a sensing element such as a magnetostrictive gauge sensor welded to the surface of an axle shaft (or axle case), distortion generated in an axle when the load on a load-carrying platform is applied to the axle is detected by the sensing element to measure the carrying load for each vehicle.

However, the self-weight meter of such a type may provide a varying detected value. This is because in accordance with the state of a vehicle placed, e.g. where the road face is poor and hence the axles are slanted, loads applied to the axles are in different orientations, and the sensing elements provide different distortions.

Generally, where the rear wheel is attached in a longitudinal direction of a large-scale vehicle, the axle cases are arranged in two rows in the longitudinal direction. Therefore, as shown in FIG. 5A, a leaf spring 13 is positioned so that its both ends are located on the corresponding upper sides 12 (12a and 12b) and its center is secured on a load carrying frame (not shown) of a vehicle body.

In this case, the curving degree of the leaf spring 13 varies with the weight carried on a vehicle so that the relative distance between the axle cases 12a and 12b varies. Therefore, slide plates 5 (5a, 5b) each having a hemisphere in section are arranged on the upper surface of the axle cases 12a and 12b, respectively so that the ends of the leaf spring 13 can slide on these slide plates 5a and 5b.

FIG. 5B shows a trunion-suspension of a rear wheel two-shaft of a large scale vehicle. Both ends of the leaf spring 13 are in contact with the axles 11 through the corresponding slide plate 5 and spacer 10, respectively. The details are shown in FIG. 8.

Taking the above structure in consideration, the applicant proposed the following attaching structure of the load measuring apparatus for a vehicle disclosed in Japanese Patent Appln. No. 6-28037 and shown in FIG. 6.

FIG. 6A is a bottom view of the slide plate 5 for attaching a sensing element in which a base plate 6 is attached. FIG. 6B is a sectional view viewed from the side, in which the sensing element 1 is attached on the one side and covered with a cover 3 from above. FIG. 6C is a sectional view viewed from the front. Incidentally, in this embodiment, the slide plate is made of carbon steel.

As seen from these figures, at both inner ends of the slide plate 5, installing places 5f for sensing elements 1 are provided. Each installing place 5f is located between two screws 5c for attachment of the axle case, and is composed of a rectangular shallow groove 5f1, a narrow deep groove 5f2 formed from the center of the slide plate 5 to that of the shallow groove 5f1 and medium deep grooves 5f3 made on both sides of the deep groove 5f2.

The shallow groove 5f1 is a portion into which a cover described later is to be fit, the medium deep groove 5f3 is a portion into which the sensing element is to be fit, and the deep groove 5f2 is a portion into which a gradient key described later is to be fit.

As seen from FIGS. 6A–6C, a slim rubber 7 is attached to the inside of the side plate 5 from the installing place 5f of the sensing element 1, and a base plate 6 is fit in the center portion of the rubber 7. A groove is formed along the center of the rubber 7. A lead wire 2 of the sensing element 1 is fit in the groove and secured there by adhesive. The tip of the lead wire 2 is connected to the base plate 6.

In the concave portion 5d inside the slide plate 5, a concave protrusion 9a is formed, and a cable 8 is fit in the concave portion. A cover 9b is screwed from above. The cable 8, the end of which is connected to the base plate 6, serves to guide the sum of the detected values by the sensing elements 1, which are attached to both ends of the slide plate 5, to the outside.

An example of the sensing element 1, as shown in FIG. 7A, is composed of a bottom plate 1d and a vertical plate 1e uprighted at its center. The vertical plate 1e is provided with four holes 1e1 and coils 1c combined in a sleeves-tied-back format by using the holes 1e1. A protrusion 1e2 formed from the vertical plate 1e serves to secure the lead wire 2 of the coil 1c.

FIG. 7B shows a gradient key 4 for securing the sensing element 1. FIG. 7C shows a metallic cover covering the upper side of the installing place 5f of the sensing element 1 on the slide plate 5.

The metallic cover 3 has a groove 3a partially formed on its inside. The end of the vertical plate 1e is fit in the groove 3a. The cover 3 is welded or bonded to cover the installing place 5f of the sensing element 1 of the slide plate 5. The sensing element 1 is fit in the cover 3. The gradient key 4, as shown in FIG. 7B, is inserted into the lower side of the sensing element 1 so that it is secured to abut on the bottom of the sensing element 1.

In the structure described above, the installing place 5f of the sensing element 1 is located between the screw holes 5c of the slide plate 5, and the sensing element 1 is arranged and secured using the cover 3 and gradient key 4. These components are complicated in machining and high in production cost.

The sensing element 1 is attached by press-fitting of the gradient key 4. The management of the press-fitting force, however, is so difficult that a small press-fitting force provides an insufficient sensor characteristic and also a too large press-fitting force provides a plastic change in the sensing element 1 leading to insufficient sensor characteristic.

In the load measuring device in the case of a trunion suspension as shown in FIG. 5B, shown in FIG. 8, the slide plate 5 with the sensing element 1 mounted therein is secured to the axle 11 through a spacer 10. Therefore, a component of the spacer 10 must be provided in addition to the sensing element 1, cover 3 and gradient key 4. Specifically, where the slide plate 5 is to be secured to the axle 11, in order that the slide plate 5 can transmit the correct load from an uneven contact face between the slide plate 5 and the axle 11, the spacer 10 for canceling the unevenness is required.

The present invention has been accomplished in view of the above defects, and intends to provide a structure for attaching a sensing element for load measurement of a motor vehicle which can reduce the number of components and provide good sensitivity.

DISCLOSURE OF THE INVENTION

In order to attain the above object, a first aspect of the invention is a structure for attaching a sensing element for measuring load on a vehicle to a slide plate, characterized in that the sensing element is mounted in an internal curved surface of said slide plate at a predetermined angle with respect to an attaching plane of the slide plate.

A second aspect of the invention is a structure for attaching a sensing element for measuring load on a vehicle to a slide plate, comprising: mounting holes made at a predetermined angle at both ends of an internal curved surface of said slide plate; sensing elements each secured in each said mounting holes; and a wiring plate placed on a concave portion of the internal curved surface of said slide plate, said wiring plate being used to integrate lead wires from said sensing elements and extend them externally.

A third aspect of the invention is a structure for attaching a sensing element for measuring load on a vehicle to a slide plate, comprising: mounting holes made at a predetermined angle at both ends of an internal curved surface of said slide plate; sensing elements each secured in each said mounting holes; gradient keys for securing the sensing elements, respectively; and a wiring plate placed on a concave portion of the internal curved surface of said slide plate, said wiring plate being used to integrate lead wires from said sensing elements and extend them externally.

A fourth aspect of the invention is a structure for attaching a sensing element for measuring load on a vehicle to a slide plate according to the third invention, characterized in that each said sensing elements is a rectangular iron core in a front shape in which a driving coil and a detecting coil are formed in a sleeves-tied-back format, and one side of said rectangular iron core is tapered.

A fifth aspect of the invention is a structure for attaching a sensing element for measuring load on a vehicle to a slide plate according to anyone of the first to third aspects of the invention, wherein said sensing elements are mounted at an angle of 20°±5°.

In accordance with the present invention, the sensing elements are mounted in the internal curved surface of the slide plate at a predetermined angle so that, when the load on a vehicle is applied onto the slide plate through the leaf spring, the slide plate, and hence the sensing element mounted therein are deformed to produce an output corresponding to the load.

The sensing elements are mounted in the slide plate so that a cover which has been conventionally mounted is not required. Any plate for transmitting stress precisely, which is provided between the slide plate and the axle, is not also required. Further, since the sensing elements are provided in the slide plate, the stress applied to the slide plate can be smoothly transmitted to the sensing elements so that they can produce an output corresponding to the load precisely.

BRIEF DESCRIPTION OF THE DRAWINGS

FIG. 1 shows an embodiment of the invention wherein; FIG. 1A is a bottom view of the slide plate, FIG. 1B is a side view shown partially in section, and FIG. 1C is a front view shown partially in section.

FIG. 2 shows a sensing element and a case assembly wherein

FIG. 4 shows a sensing element and a gradient key wherein

FIG. 5 shows a relationship among vehicle components in which the invention is employed wherein

FIG. 6 shows a prior art device wherein FIG. 6A is a bottom view of a slide plate, FIG. 6B is a side view partially in section, and FIG. 6C is a front view shown partially in section.

FIG. 7 shows another prior art device wherein

BEST MODE FOR CARRYING OUT THE INVENTION

Figure 2A:
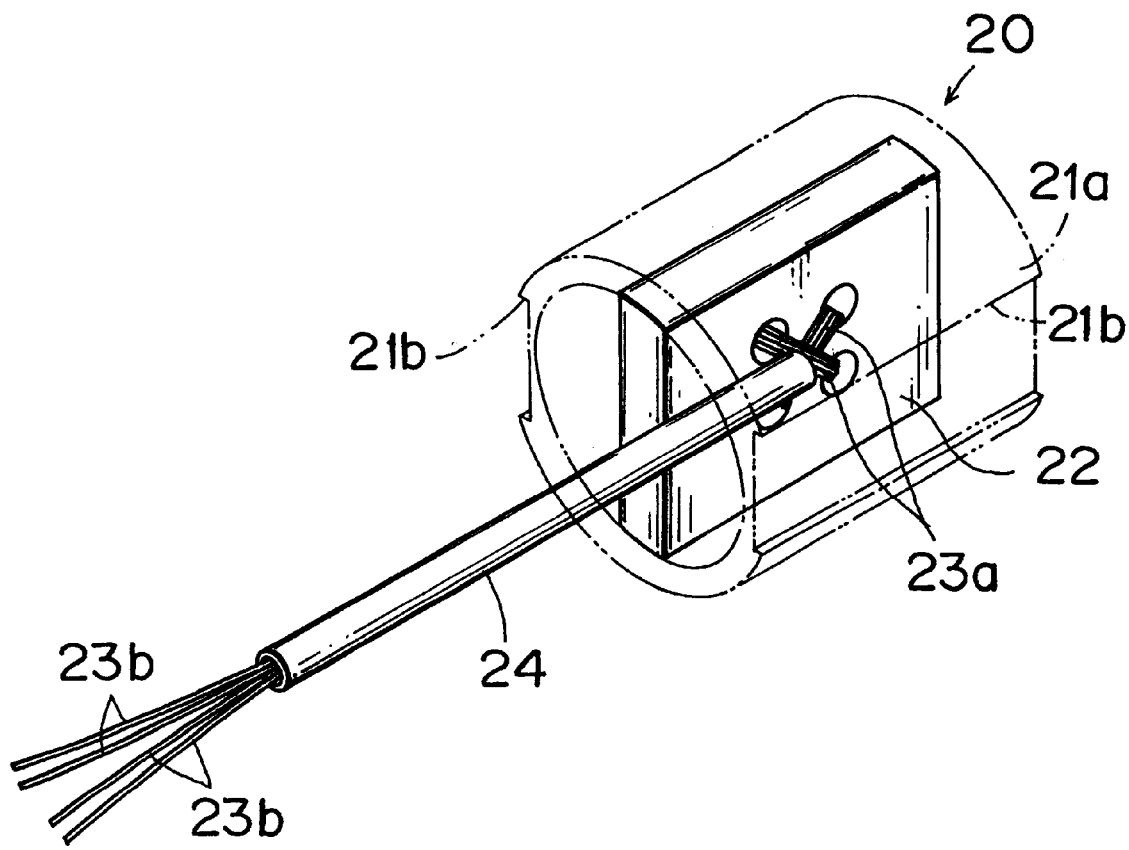
FIG. 2A is a perspective view of the case assembly in which a sensing element is housed.

Now referring to the drawings, an explanation will be given of embodiments of the present invention.

FIG. 1 shows an embodiment of a structure for attaching a sensing element for load measurement of a motor vehicle according to the present invention. FIG. 1A is a bottom view viewed from an internal curved face 15a of a slide plate (pad) 15 for attaching the sensing element; FIG. 1B is a sectional view partially cut viewed from the side; and FIG. 1C is a sectional view viewed from the front.

Figure 2B:
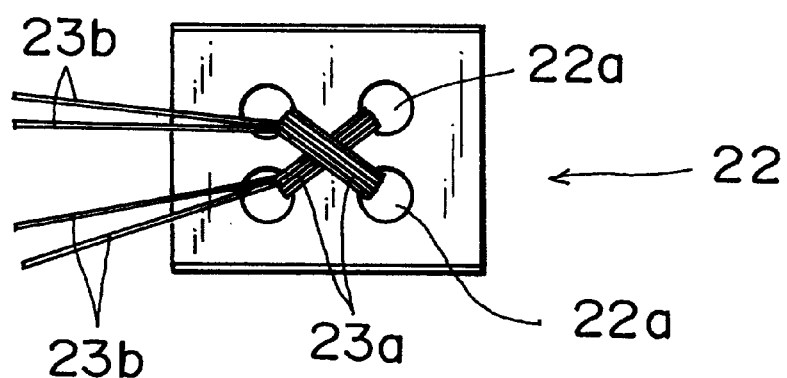
FIG. 2B is a front view of the sensing element.

FIG. 2 shows a sensing element used in this embodiment. FIG. 2A is a perspective view of the case assembly in which a sensing element is housed, and FIG. 2B is a front view of the sensing element.

An explanation will be given of an embodiment of the sensing element for measuring load. FIG. 2A shows a case assembly 20 in which a magnetostrictive sensing element 22 of magnetic material is inserted in and secured to a cylindrical case 21a of steel. As shown in FIG. 2B, the sensing element 22 is configured so that coils 23a for driving and detecting are wound in a sleeves-tied-back format through four holes 22a and lead wires 23b are guided through insulating tubes 24. The case 21a has shouldered securing portions 21b on its outer surface.

Referring to FIG. 1, an explanation will be given of an attaching structure of a sensing element for measuring load. In FIG. 1, the slide plate 15 is made of e.g. carbon steel. At each of both edges of an inner curved face 15a of the slide plate 15, a hole 15f in which the sensing element 21 is installed is provided. The installing hole 15f is located between two screw holes 15c used to attach the slide plate 15 onto the axle case. A concave portion 15d is formed on the inner curved face 15a of the slide plate 15 between its both ends. A wiring plate 16 is secured on the concave portion 15d. The wiring plate 16 is connected to lead wires 23b of the sensing element 22. The wiring plate 16 is secured to a protrusion 15b equipped with screw holes, protruding at the approximate center of the concave portion 15d, are secured to the wiring plate 16 by the screws 19. A wiring 18 is extended from the approximate center of the wiring plate 16. The wiring plate 16, lead wire 23b and insulating tube 24 are molded by resin 17 filled in the concave portion 15d.

The installing holes 15f formed on the slide plate 15 may be a shape corresponding to that of the sensing element 21 to be mounted. In the embodiment of FIG. 1, since the case assembly 20 with the sensing element inserted as shown in FIG. 2 is cylindrical, the installing hole 15 is caused to have a cylindrical shape. In the cylinder, securing portions are formed according to the shape as shown in FIG. 2. The case assembly 20 is welded on the slide plate 20 as necessity requires.

As shown in FIG. 1B, the installing hole 15f is formed at a mounting angle of 20° with respect to the attaching plane 15e of the slide plate 15. In this case, since the slide plate 15 is curved, force is not applied to the curved portion in a vertical direction, but in a slanted direction with respect to the attaching plane 15e. Therefore, the sensing element 21 is arranged at an angle of 20° so that the force is applied in a direction perpendicular to its insertion axis C.

Incidentally, it should be noted that the insertion angle is not limited to 20°, but may be optionally determined in a range of 20±5° for load measurement.

Figure 3:
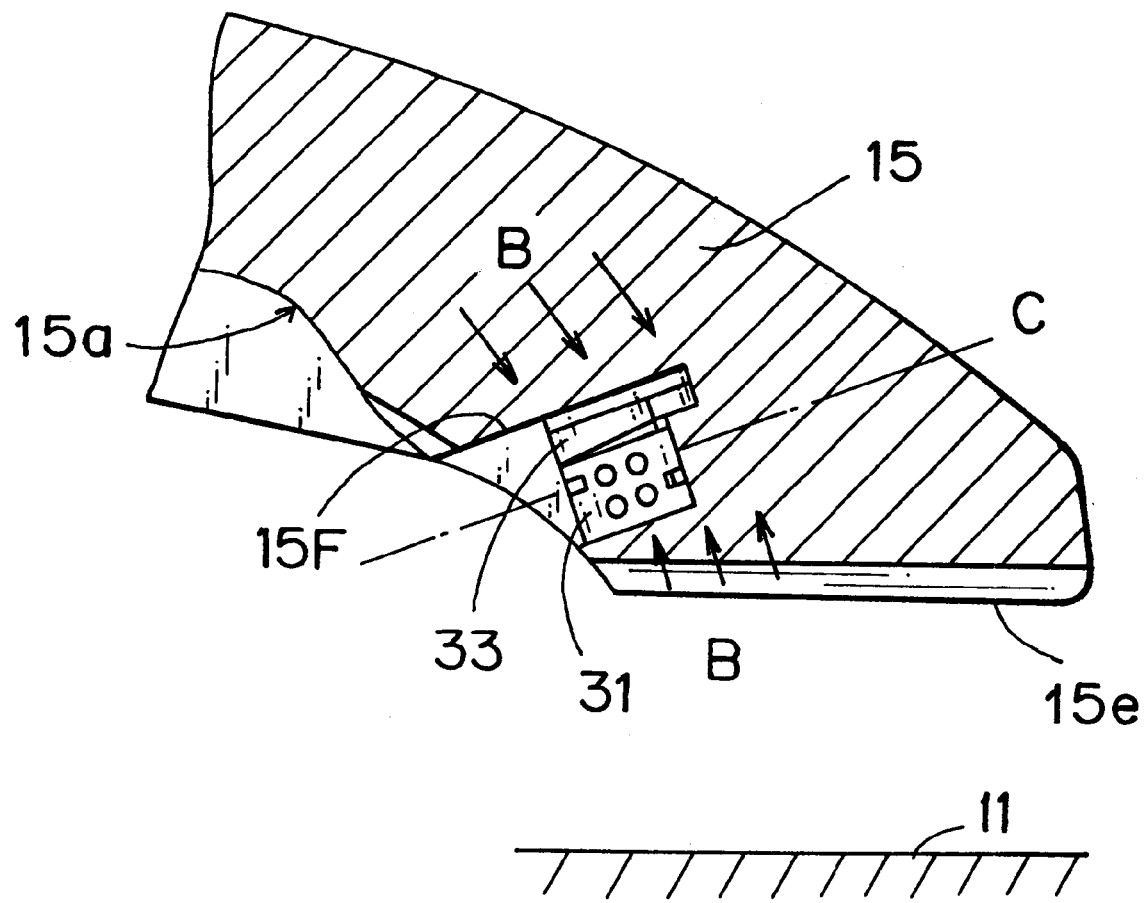
FIG. 3 is a sectional view of another embodiment of the present invention.
Figure 4A:
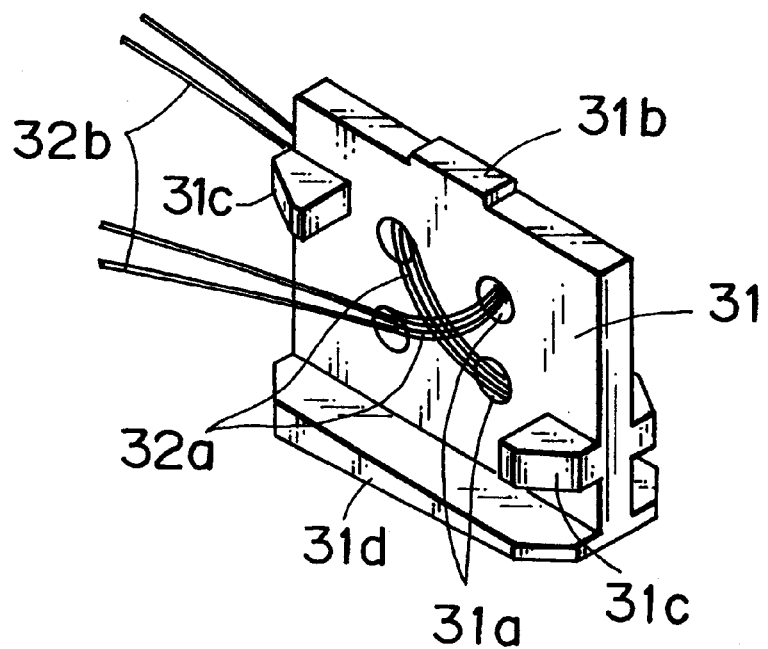
FIG. 4A is a perspective view showing an embodiment of the sensing element and FIG. 4B is a perspective view of the gradient key.
Figure 4B:
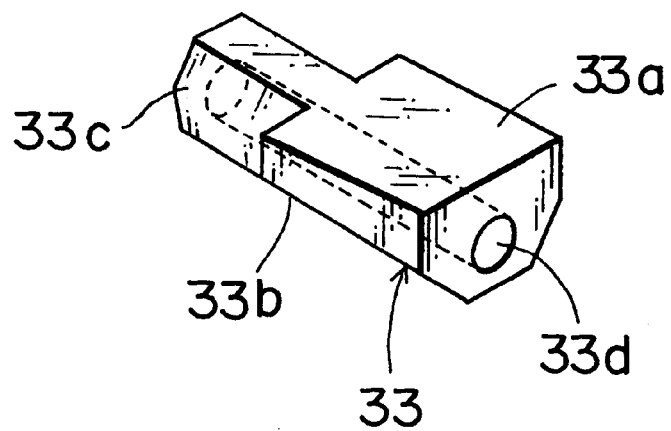
Figure 5A:
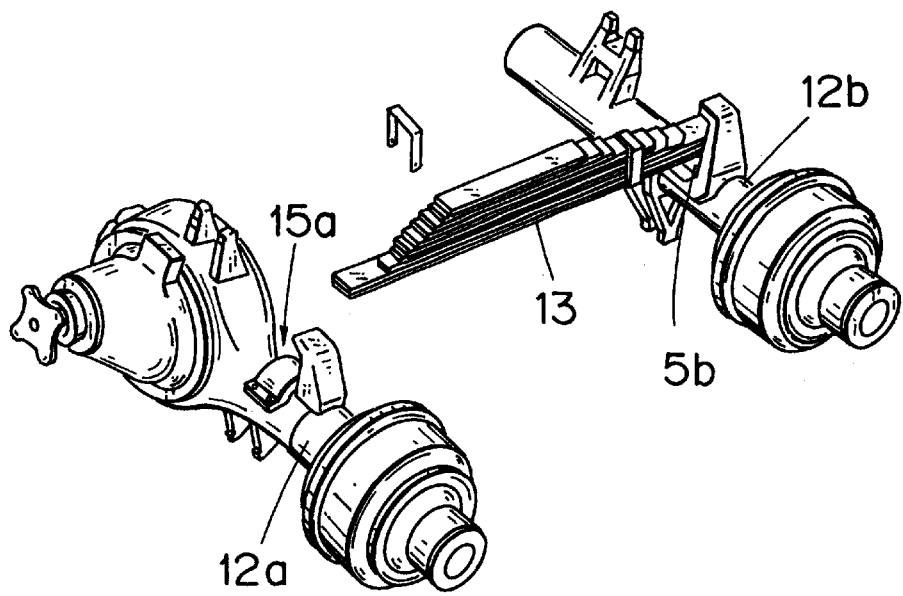
FIG. 5A is an exploded perspective view showing a relationship among a slide plate, axle, leaf spring, etc. in a vehicle
Figure 5B:
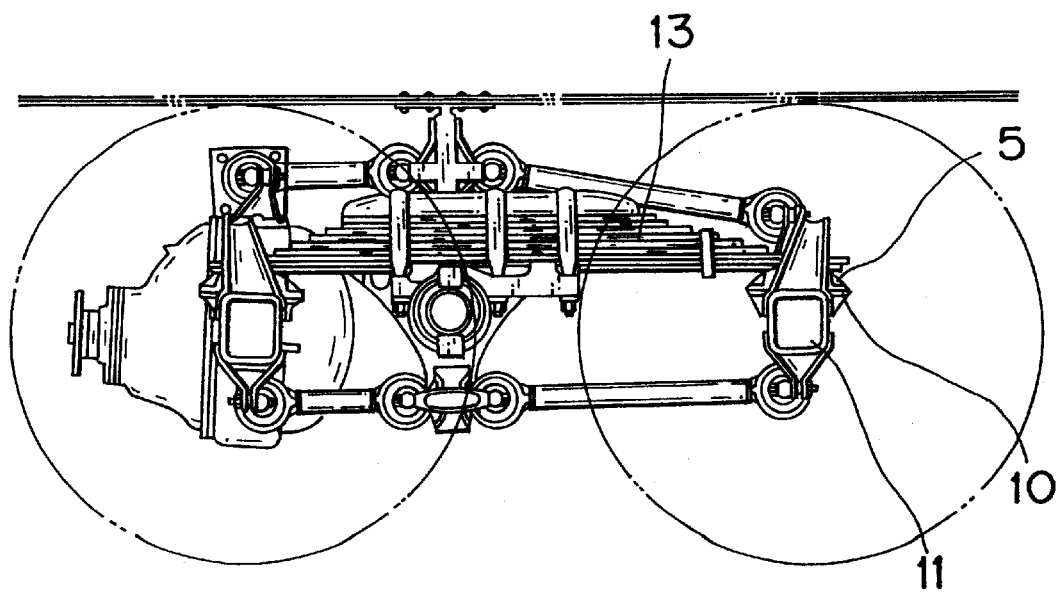
FIG. 5B is a side view of a trunion suspension.
Figure 7A:
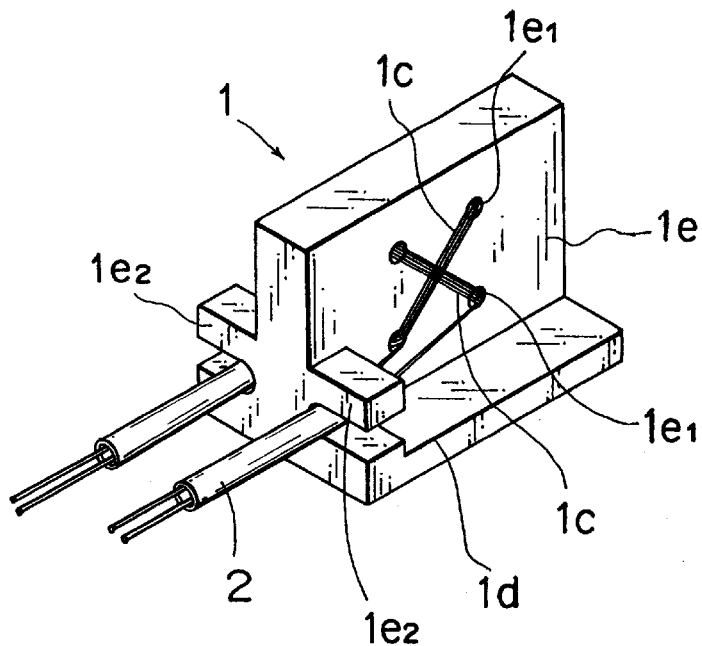
FIG. 7A is a perspective view of the prior art sensing element.
Figure 7B:
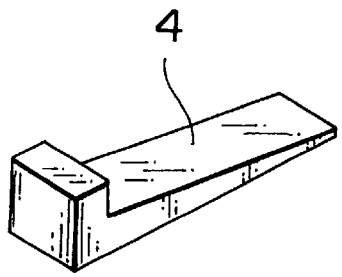
FIG. 7B is a perspective view of a gradient key.
Figure 7C:
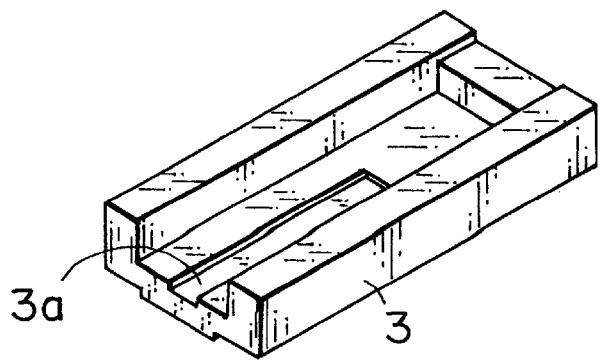
FIG. 7C is a perspective view of a cover.
Figure 8:
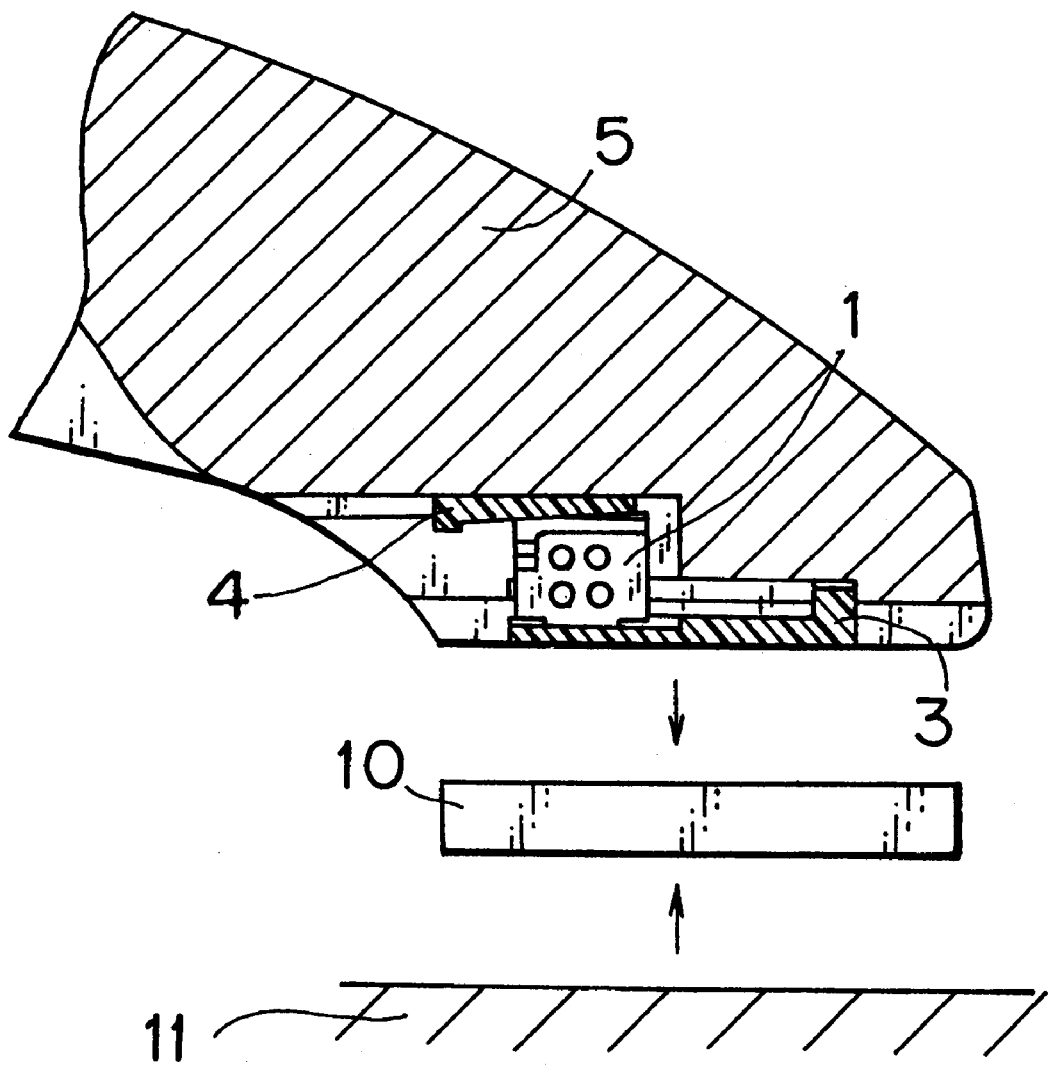
FIG. 8 is a view for explaining a conventional attaching state of a slide plate.

Referring to FIGS. 3 an 4, an explanation will be given of another embodiment of the present invention. FIG. 3 is a main part of the attaching structure of the sensing element for a vehicle. FIGS. 4A and 4B show the structure of the sensing element.

In FIG. 3, the slide plate 15 is substantially the same as in the embodiment of FIG. 1, but shapes of an installing hole F in which the sensing element 31 is to be mounted and of the sensing element 31 itself are different from those in the embodiment of FIG. 1. On the inner curved face 15a of the slide plate 15, as in the embodiment of FIG. 1, an installing hole 15F is formed at an angle of 20° with respect to an attaching face 15e. The sensing element 31 is inserted in the installing hole 15F and secured by a gradient key 33. As shown in FIG. 1, a lead wire of the sensing element 31 is connected to a wiring plate centrally arranged on the slide plate 15 and guided externally. These wiring plate and lead wire are fixed using resin.

The sensing element 31 has a structure as shown in FIG. 4A. Specifically, a vertical plate has a substantially rectangular front shape in which coils 32a for driving and detecting are wound through four holes 31a made on the front. The vertical plate portion is provided with protrusions 31b, 31c and bottom plate 31d. The protrusions 31b, 31c are in contact with the inner wall of the installing hole 15F, the bottom plate 31d is in contact with the surface 33b of the gradient key 33 as shown in FIG. 4B, the surface 33a is in contact with the inner wall of the installing hole 15F, and the tip 33c of the gradient key 33 is inserted in the installing hole 15F so that the sensing element 31 is secured in the installing hole 15F. The gradient key 33 has a through-hole 33d.

In this embodiment, the installing hole 15F in the slide plate 15 is provided so that the insertion axis C of the sensing element is placed at an angle of 20° with respect to the attaching plane 15e. In this case, as described above, since the slide plate 15 is curved, force is not applied to the curved portion in a vertical direction, but in a slanted direction with respect to the attaching plane 15e as indicated by arrow B in FIG. 3. Therefore, the sensing element 21 is arranged at an insertion angle of 20° so that the force is to applied in a direction substantially perpendicular to its insertion axis C.

It is needless to say that the detection sensitivity can be maintained as long as the mounting angle is within a range of 20±5° as in the previous embodiment.

The sensing element inserted in the slide plate is fixed by welding. Unlike the prior art, at least the cover or plate is not required so that the number of components can be reduced.

Thus, the sensing element can be arranged and secured firmly. The insertion angle of the sensing element permits force applied to the curved slide plate to be effectively transmitted to the sensing element.

The sensing element may be inserted in the case as shown in FIG. 2, or may be tapered in one side of its rectangular front shape as shown in FIG. 4.

INDUSTRIAL APPLICABILITY

As described hitherto, in accordance with the present invention, the sensing elements are mounted in the internal curved surface of the slide plate at a predetermined angle so that the stress occurring in the slide plate when the load on a vehicle is applied onto the slide plate through the leaf spring is smoothly transmitted to the sensing elements. Thus, an output corresponding to the load can be generated from the sensing elements, and the load can be detected at very high sensitivity.

In accordance with the present invention, the sensing elements are mounted in the slide plate so that a cover which has been conventionally mounted is not required. Any plate for transmitting stress precisely, which is provided between the slide plate and the axle, is not required. This permits the number of components to be reduced.

What is claimed is:

1. A structure for attaching a sensing element for measuring load on a vehicle to a slide plate having attaching planes at opposite ends and an internally curved face extending between said attaching planes, comprising:

mounting means defined by a receptacle provided in the internally curved face of said slide plate, said receptacle having an insertion axis inclined at an angle with respect to an adjacent attaching plane, said angle being determined as that at which displacement stress of the slide plate is applied to said insertion axis at a substantially right angle.

2. A structure for attaching a sensing element for measuring load on a vehicle to a slide plate having attaching planes for mounting said slide plate to said vehicle, comprising:

mounting holes for receiving said sensing element formed in said slide plate and having an insertion axis inclined at an angle with respect to the respective attaching planes determined as that angle at which displacement stress of the slide plate is applied to said insertion axis at a substantially right angle at both ends of an internal curved surface extending between said attaching planes of said slide plate;

a sensing element secured in each said mounting hole; and a wiring plate placed on a concave portion of the internal curved surface of said slide plate, said wiring plate being operative to integrate lead wires from said sensing elements and extend them externally.

3. A structure for attaching a sensing element for measuring load on a vehicle to a slide plate having attaching planes for mounting said slide plate to said vehicle, comprising:

mounting holes for receiving said sensing element formed in said slide plate and having an insertion axis inclined at an angle with respect to the respective attaching planes determined as that angle at which displacement stress of the slide plate is applied to said insertion axis at a substantially right angle at both ends of an internal curved surface extending between said attaching planes of said slide plate;

a sensing element mounted in each said mounting hole;

gradient keys for securing the sensing elements in said mounting holes; and a wiring plate placed on a concave portion of the internal curved surface of said slide plate, said wiring plate being operative to integrate lead wires from said sensing elements and extend them externally.

4. A structure for attaching a sensing element for measuring load on a vehicle to a slide plate according to claim 3, wherein each said sensing elements is a rectangular iron core in a front shape in which a driving coil and a detecting coil are formed in a sleeves-tied-back format, and one side of said rectangular iron core is tapered.

5. A structure for attaching a sensing element for measuring load on a vehicle to a slide plate according to claim 1, wherein the angle of said insertion axis with respect to said adjacent attaching plane is within a range of 20°±5°.

6. A structure for attaching a sensing element for measuring load on a vehicle to a slide plate according to claim 2, wherein the angle of said insertion with respect to said adjacent attaching plane is within a range of 20°±5°.

7. A structure for attaching a sensing element for measuring load on a vehicle to a slide plate according to claim 3, wherein the angle of said insertion with respect to said adjacent attaching plane is within a range of 20°±5°.

\* \* \* \* \*